United States Patent
Couderc et al.

(10) Patent No.: US 12,054,679 B2
(45) Date of Patent: Aug. 6, 2024

(54) METHOD FOR PRODUCING GASOLINE WITH LOW SULPHUR AND MERCAPTAN CONTENT

(71) Applicant: IFP Energies nouvelles, Rueil-Malmaison (FR)

(72) Inventors: Sophie Couderc, Rueil-Malmaison (FR); Adrien Gomez, Rueil-Malmaison (FR); Clementina Lopez-Garcia, Rueil-Malmaison (FR); Philibert Leflaive, Rueil-Malmaison (FR); Damien Hudebine, Rueil-Malmaison (FR); Floriane Maldonado, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 261 days.

(21) Appl. No.: 17/629,087

(22) PCT Filed: Jul. 6, 2020

(86) PCT No.: PCT/EP2020/069034
§ 371 (c)(1),
(2) Date: Jan. 21, 2022

(87) PCT Pub. No.: WO2021/013528
PCT Pub. Date: Jan. 28, 2021

(65) Prior Publication Data
US 2022/0267686 A1 Aug. 25, 2022

(30) Foreign Application Priority Data
Jul. 23, 2019 (FR) ..................................... 1908345

(51) Int. Cl.
*C10G 65/00* (2006.01)
*B01D 3/14* (2006.01)
(Continued)

(52) U.S. Cl.
CPC ............. *C10G 65/04* (2013.01); *B01D 3/143* (2013.01); *C10L 1/06* (2013.01);
(Continued)

(58) Field of Classification Search
CPC ........ B01D 3/143; C10G 65/04; C10G 11/00; C10G 45/38; C10G 45/08;
(Continued)

(56) References Cited

U.S. PATENT DOCUMENTS

2002/0153280 A1 10/2002 Didillon et al.
2014/0374315 A1 12/2014 Gornay et al.

FOREIGN PATENT DOCUMENTS

EP 1077247 A1 2/2001
EP 2816094 A1 12/2014

OTHER PUBLICATIONS

International Search Report for PCT/EP2020/069034 dated Jul. 27, 2020.

*Primary Examiner* — Prem C Singh
*Assistant Examiner* — Brandi M Doyle
(74) *Attorney, Agent, or Firm* — Millen, White, Zelano & Branigan, P.C.; Brion P. Heaney

(57) ABSTRACT

A process for the treatment of a gasoline containing sulfur compounds and olefins includes the following stages:
a) hydrodesulfurization in the presence of a catalyst having an oxide support and an active phase having a metal from group VIB and a metal from group VIII,
b) hydrodesulfurization at a higher temperature than that of stage a) and in the presence of a catalyst having an oxide support and an active phase with at least one metal from group VIII,
c) separation of $H_2S$ formed,
d) hydrodesulfurization at a low hydrogen/feedstock ratio and in the presence of a hydrodesulfurization catalyst
(Continued)

having an oxide support and an active phase having a metal from group VIB and a metal from group VIII or an active phase with at least one metal from group VIII, and e) further separation of H$_2$S formed.

20 Claims, 2 Drawing Sheets

(51) Int. Cl.
*C10G 65/04* (2006.01)
*C10L 1/06* (2006.01)

(52) U.S. Cl.
CPC .............. *C10G 2300/104* (2013.01); *C10G 2300/1044* (2013.01); *C10G 2300/202* (2013.01); *C10L 2200/0423* (2013.01); *C10L 2270/023* (2013.01); *C10L 2290/543* (2013.01)

(58) Field of Classification Search
CPC ...... C10G 2300/1044; C10G 2300/202; C10G 2300/104
See application file for complete search history.

METHOD FOR PRODUCING GASOLINE WITH LOW SULPHUR AND MERCAPTAN CONTENT

TECHNICAL FIELD

The present invention relates to a process for the production of gasoline having a low content of sulfur and of mercaptans.

STATE OF THE ART

The production of gasolines meeting new environmental standards requires that their sulfur content be significantly decreased.

It is furthermore known that conversion gasolines, and more particularly those originating from catalytic cracking, which can represent from 30% to 50% of the gasoline pool, have high contents of monoolefins and of sulfur.

The sulfur present in gasolines is for this reason attributable, to close to 90%, to the gasolines resulting from catalytic cracking processes, which will be called FCC (Fluid Catalytic Cracking) gasolines subsequently. FCC gasolines thus constitute the preferred feedstock for the process of the present invention.

Among the possible routes for producing fuels having a low sulfur content, that which has been very widely adopted consists in specifically treating sulfur-rich gasoline bases by catalytic hydrodesulfurization processes in the presence of hydrogen. Conventional processes desulfurize gasolines in a nonselective manner by hydrogenating a large part of the monoolefins, which causes a high loss in octane number and a high consumption of hydrogen. The most recent processes, such as the Prime G+(trademark) process, make it possible to desulfurize cracked gasolines rich in olefins, while limiting the hydrogenation of the monoolefins and consequently the loss of octane and the high hydrogen consumption which results therefrom. Such processes are, for example, described in the patent applications EP 1 077 247 and EP 1 174 485.

The residual sulfur compounds generally present in desulfurized gasoline can be separated into two distinct families: the unconverted refractory sulfur compounds present in the feedstock, on the one hand, and the sulfur compounds formed in the reactor by secondary "recombination" reactions. Among this last family of sulfur compounds, the predominant compounds are the mercaptans resulting from the addition of $H_2S$ formed in the reactor to the monoolefins present in the feedstock.

Mercaptans, of chemical formula R—SH, where R is an alkyl group, are also called recombinant mercaptans. Their formation or their decomposition obeys the thermodynamic equilibrium of the reaction between monoolefins and hydrogen sulfide to form recombinant mercaptans. An example is illustrated according to the following reaction:

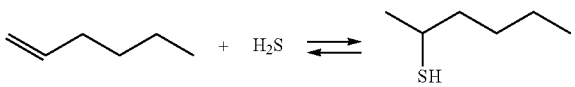

The sulfur contained in the recombinant mercaptans generally represents between 20% and 80% by weight of the residual sulfur in desulfurized gasolines.

The formation of recombinant mercaptans is in particular described in the U.S. Pat. No. 6,231,754 and the patent application WO01/40409, which teach various combinations of operating conditions and of catalysts making it possible to limit the formation of recombinant mercaptans.

Other solutions to the problem of the formation of recombinant mercaptans are based on a treatment of partially desulfurized gasolines in order to extract therefrom said recombinant mercaptans. Some of these solutions are described in the patent applications WO02/28988 or WO01/79391.

Still other solutions are described in the literature for desulfurizing cracked gasolines using a combination of stages of hydrodesulfurization and of removal of the recombinant mercaptans by reaction to give thioethers or disulfides (also called sweetening) (see, for example, U.S. Pat. Nos. 7,799,210, 6,960,291, US2007114156, EP 2 861 094).

The document WO2018/096063 describes a process for the production of hydrocarbons having a low content of sulfur and of mercaptans using a high gas/feedstock flow rate ratio.

To obtain a gasoline having a very low sulfur content, typically with a content of less than 10 ppm by weight, thus requires the removal of at least a portion of the recombinant mercaptans. Virtually all countries have a very low specification for mercaptans in fuels (typically less than 10 ppm sulfur resulting from RSHs (measurement of content of mercaptans by potentiometry, ASTM D3227 method).

Other countries have adopted a "Doctor Test" measurement to quantify the mercaptans with a negative specification to be observed (ASTM D4952 method).

Thus, in some cases, it appears that the most restrictive specification, because it is the most difficult to achieve without harming the octane number, is the specification for mercaptans and not that of the total sulfur.

When gasoline is treated by a sequence of two reactors without removal of the $H_2S$ between the two stages, as described in the document EP 1 077 247, the first stage, also called the selective HDS stage, generally has the aim of carrying out a deep desulfurization of the gasoline with a minimum of saturation of the olefins (and no aromatic loss), resulting in a maximum octane retention. The catalyst employed is generally a catalyst of CoMo type. During this stage, new sulfur compounds are formed by recombination of the $H_2S$ resulting from the desulfurization and olefins: recombinant mercaptans.

The second stage generally has the role of minimizing the amount of recombinant mercaptans. For this, the gasoline is then treated in a hydrodesulfurization reactor, also called finishing reactor, with a catalyst generally based on nickel which exhibits virtually no olefin hydrogenation activity and is capable of reducing the amount of recombinant mercaptans. The temperature is generally higher in the finishing reactor in order to thermodynamically promote the removal of the mercaptans. In practice, an oven is thus placed between the two reactors in order to be able to raise the temperature of the second reactor to a temperature greater than that of the first.

Another means for reducing the amount of recombinant mercaptans in the second reactor is to increase the ratio of the hydrogen flow rate to the flow rate of feedstock to be treated, also referred to hereinafter as the $H_2$/HC ratio. Increasing the $H_2$/HC ratio in the finishing stage makes it possible, by dilution, to reduce the partial pressure of the $H_2S$ ($ppH_2S$) formed by hydrodesulfurization during the selective HDS stage. This fall in the partial pressure of the $H_2S$ promotes the removal of the recombinant mercaptans by the reaction between the olefins and the $H_2S$ (thermodynamic equilibrium).

It is thus possible to increase the temperature and/or the $H_2/HC$ ratio in order to reduce the content of recombinant mercaptans in the finishing stage. However, the temperature and/or the $H_2/HC$ ratio cannot be increased without limit. This is because an excessively high temperature in the finishing stage causes problems with cracking of the gasoline and coking of the catalyst and thus reduces the lifetime of the catalyst. Likewise, excessive injection of hydrogen with respect to the feedstock flow rate constitutes an additional hydrogen cost for the refinery operator. Moreover, hydrogenation reactions of the olefins may occur.

It is therefore necessary to find other means for reducing the amount of recombinant mercaptans, in particular when the source gasoline has a high content of sulfur.

SUMMARY OF THE INVENTION

One aim of the present invention is to propose a process for treating a gasoline which makes it possible to reduce the content of mercaptans in said gasoline while at the same time limiting the loss of octane and consumption of reactants such as hydrogen to the maximum extent.

The present invention proposes a process which makes it possible to treat a gasoline containing sulfur compounds by using a sequence of two reactors without removal of $H_2S$ between the two stages, followed by a stage of separation of the $H_2S$ formed during these stages and by an additional hydrodesulfurization stage carried out under very mild conditions.

More particularly, a subject matter of the invention is a process for the treatment of a gasoline containing sulfur compounds, olefins and diolefins, the process comprising at least the following stages:

a) the gasoline, hydrogen and a hydrodesulfurization catalyst comprising an oxide support and an active phase comprising a metal from group VIB and a metal from group VIII are brought into contact in at least one reactor at a temperature of between 210 and 320° C., at a pressure of between 1 and 4 MPa, with a space velocity of between 1 and 10 $h^{-1}$ and a ratio of the hydrogen flow rate, expressed in normal $m^3$ per hour, to the flow rate of feedstock to be treated, expressed in $m^3$ per hour at standard conditions, of between 100 $Nm^3/m^3$ and 600 $Nm^3/m^3$, so as to convert at least a portion of the sulfur compounds into $H_2S$, b) the effluent resulting from stage a) without removal of the $H_2S$ formed, hydrogen and a hydrodesulfurization catalyst comprising an oxide support and an active phase consisting of at least one metal from group VIII are brought into contact in at least one reactor at a temperature of between 280 and 400° C., at a pressure of between 0.5 and 5 MPa, with a space velocity of between 1 and 10 $h^{-1}$ and a ratio of the hydrogen flow rate, expressed in normal $m^3$ per hour, to the flow rate of feedstock to be treated, expressed in $m^3$ per hour at standard conditions, of between 100 and 600 $Nm^3/m^3$, said temperature of stage b) being higher than the temperature of stage a), c) a stage of separation of the $H_2S$ formed and present in the effluent resulting from stage b) is carried out, d) the effluent depleted in $H_2S$ resulting from stage c), hydrogen and a hydrodesulfurization catalyst comprising an oxide support and an active phase comprising a metal from group VIB and a metal from group VIII or an active phase consisting of at least one metal from group VIII are brought into contact in at least one reactor at a temperature of between 150 and 330° C., at a pressure of between 0.5 and 5 MPa, with a space velocity of between 0.5 and 10 $h^{-1}$ and a ratio of the hydrogen flow rate to the flow rate of feedstock to be treated which is lower than that of stage a), e) a stage of separation of the $H_2S$ formed and present in the effluent resulting from stage d) is carried out.

It has specifically been found, surprisingly, that a specific sequence of hydrodesulfurization stages each using specific operating conditions in combination with specific catalysts for each hydrodesulfurization stage, combined with $H_2S$ separation stages, makes it possible to operate at conditions that are thermodynamically favorable for the removal of the recombinant mercaptans, and thus leads to a sufficient conversion of the recombinant mercaptans.

Specifically, the implementation of the hydrodesulfurization stages a) and b), stage b) being carried out at more severe operating conditions and in the presence of a catalyst based on a metal from group VIII only, makes it possible to achieve a high overall hydrodesulfurization level. The residual sulfur compounds in the effluent from stage b) are essentially recombinant mercaptans. The separation stage c) promotes, from the viewpoint of thermodynamic equilibrium, the decomposition of the recombinant mercaptans and thus their removal in stage d). Specifically, the recombinant mercaptans remaining in the effluent after stage c) are compounds that are relatively easy to hydrodesulfurize compared to the more refractory compounds removed during stage b). The remaining recombinant mercaptans may therefore be hydrodesulfurized during stage d) at relatively mild operating conditions. The process according to the invention therefore makes it possible to produce a gasoline having a low sulfur and mercaptan content specification, without requiring a severe and costly hydrodesulfurization finishing stage and at the same time limiting the loss of octane.

Another advantage of the process according to the invention stems from the fact that it makes it possible to achieve a very low content of mercaptans (e.g. less than 10 ppm by weight sulfur) in the final desulfurized gasoline, with operating conditions for hydrodesulfurization stage b) that are much less severe (for example, significant reduction in the operating pressure and/or temperature) than those described for the finishing stage of the process according to EP 1 077 247, which has the effect of limiting the loss of octane, of increasing the lifetime of the catalyst of the hydrodesulfurization stage and also of reducing the energy consumption.

Another advantage of the process according to the invention comes from the fact that it can easily be installed on existing units (remodeling or revamping).

According to an alternative form of the invention, the catalyst of stage a) comprises alumina and an active phase comprising cobalt, molybdenum and optionally phosphorus, said catalyst containing a content by weight, with respect to the total weight of catalyst, of cobalt oxide, in CoO form, of between 0.1% and 10%, a content by weight, with respect to the total weight of catalyst, of molybdenum oxide, in $MoO_3$ form, of between 1% and 20%, a cobalt/molybdenum molar ratio of between 0.1 and 0.8 and a content by weight, with respect to the total weight of catalyst, of phosphorus oxide in $P_2O_5$ form of between 0.3% and 10% when phosphorus is present, said catalyst having a specific surface area of between 30 and 180 $m^2/g$.

According to an alternative form, the catalyst of stage b) consists of alumina and of nickel, said catalyst containing a content by weight, with respect to the total weight of catalyst, of nickel oxide, in NiO form, of between 5% and 20%, said catalyst having a specific surface area of between 30 and 180 m$^2$/g.

According to an alternative form, the catalyst of stage d) consists of alumina and of a cobalt-molybdenum active phase, said catalyst containing a content by weight, with respect to the total weight of catalyst, of cobalt oxide, in CoO form, of between 0.1% and 10%, a content by weight, with respect to the total weight of catalyst, of molybdenum oxide, in MoO$_3$ form, of between 1% and 20%, and a cobalt/molybdenum molar ratio of between 0.1 and 0.8, said catalyst having a specific surface area of between 30 and 180 m$^2$/g.

According to another alternative form, the catalyst of stage d) consists of alumina and of nickel, said catalyst containing a content by weight, with respect to the total weight of catalyst, of nickel oxide, in NiO form, of between 5% and 20%, said catalyst having a specific surface area of between 30 and 180 m$^2$/g.

According to an alternative form, the temperature of stage b) is greater by at least 5° C. than the temperature of stage a).

According to an alternative form, the temperature of stage d) is lower by at least 5° C. than the temperature of stage b).

According to an alternative form, the ratio of ratio of the hydrogen flow rate to the flow rate of feedstock to be treated at the inlet of the reactor of stage a)/ratio of the hydrogen flow rate to the flow rate of feedstock to be treated at the inlet of the reactor of stage d) is greater than or equal to 1.05.

According to an alternative form, the separation stages c) and e) are carried out in a debutanizer or a stripping section.

According to an alternative form, before stage a), a stage of distillation of the gasoline is carried out so as to fractionate said gasoline into at least two, light and heavy, gasoline cuts, and the heavy gasoline cut is treated in stages a), b), c), d) and e).

According to an alternative form, before stage a) and before any optional distillation stage, the gasoline is brought into contact with hydrogen and a selective hydrogenation catalyst in order to selectively hydrogenate the diolefins contained in said gasoline to give olefins.

According to an alternative form, the gasoline is a catalytic cracking gasoline.

Subsequently, the groups of chemical elements are given according to the CAS classification (CRC Handbook of Chemistry and Physics, published by CRC Press, editor-in-chief D. R. Lide, 81$^{st}$ edition, 2000-2001). For example, group VIII according to the CAS classification corresponds to the metals of Columns 8, 9 and 10 according to the new IUPAC classification.

The content of metals is measured by X-ray fluorescence.

DETAILED DESCRIPTION OF THE INVENTION

Description of the Feedstock

Figure 1:
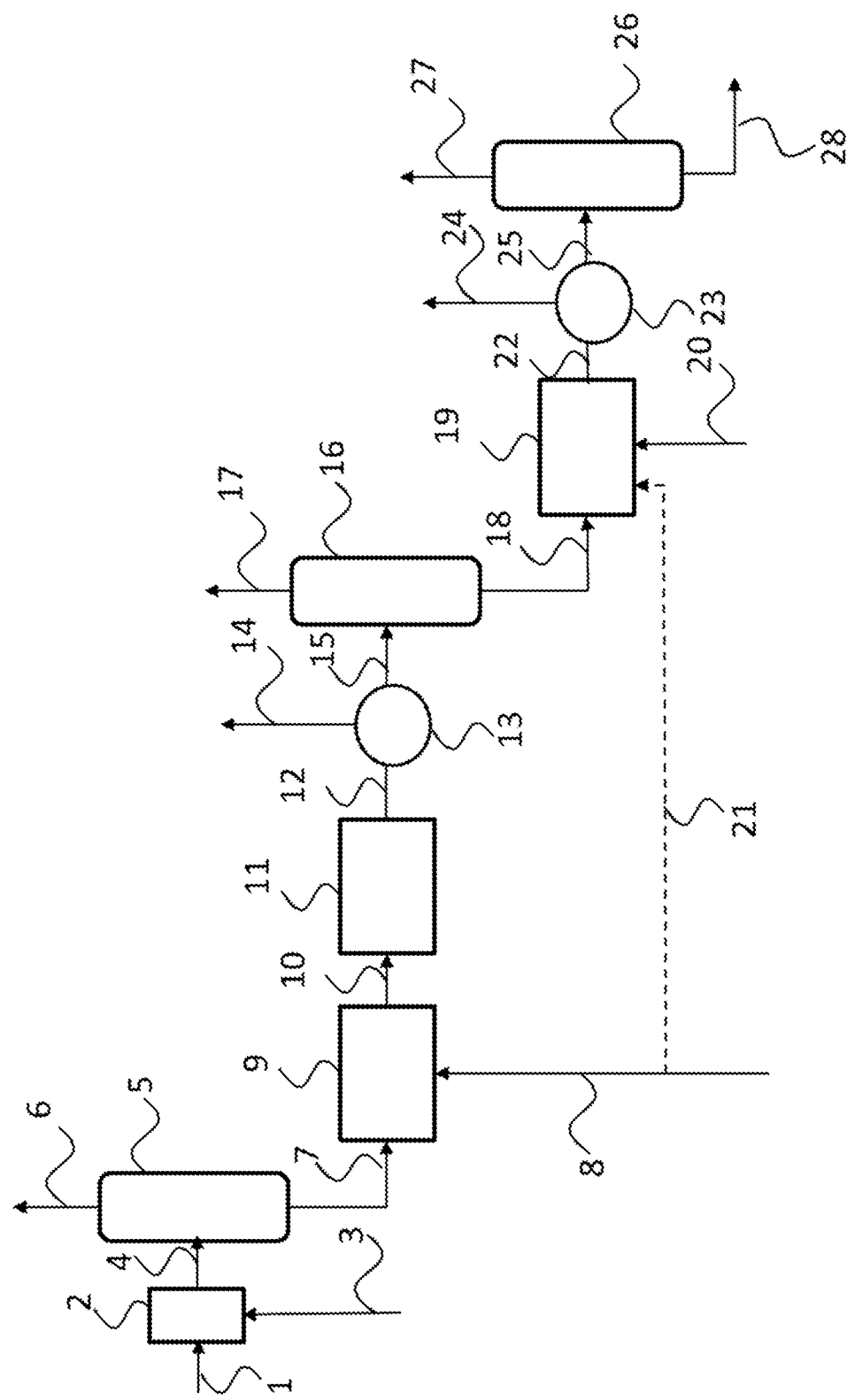
FIG. 1 illustrates an embodiment according to the invention.

The process according to the invention makes it possible to treat any type of gasoline cut containing sulfur compounds and olefins, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracking gasoline). Said feedstock preferably consists of a gasoline cut resulting from a catalytic cracking unit.

The feedstock is a gasoline cut containing sulfur compounds and olefins, the boiling point range of which typically extends from the boiling points of the hydrocarbons having 2 or 3 carbon atoms (C2 or C3) up to 260° C., preferably from the boiling points of the hydrocarbons having 2 or 3 carbon atoms (C2 or C3) up to 220° C., more preferably from the boiling points of the hydrocarbons having 5 carbon atoms up to 220° C. The process according to the invention can also treat feedstocks having lower end points than those mentioned above, such as, for example, a C5-180° C. cut.

The sulfur content of the gasoline cuts produced by catalytic cracking (FCC) depends on the sulfur content of the feedstock treated by the FCC, on the presence or not of a pretreatment of the feedstock of the FCC, and also on the end point of the cut. Generally, the sulfur contents of the whole of a gasoline cut, in particular those originating from the FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

The feedstock treated by the process according to the invention can be a feedstock containing sulfur compounds in a content of greater than 1000 ppm by weight of sulfur and possibly greater than 1500 ppm.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, generally including less than 300 ppm of mercaptans.

Description of the Hydrodesulfurization Stage a)

The hydrodesulfurization stage a) is implemented in order to reduce the sulfur content of the gasoline to be treated by converting the sulfur compounds into H$_2$S, which is subsequently removed in stage c).

The hydrodesulfurization stage a) consists in bringing the gasoline to be treated into contact with hydrogen, in one or more hydrodesulfurization reactors, containing one or more catalysts suitable for carrying out the hydrodesulfurization.

According to a preferred embodiment of the invention, stage a) is implemented with the aim of carrying out a hydrodesulfurization selectively, that is to say with a degree of hydrogenation of the monoolefins of less than 80%, preferably of less than 70% and very preferably of less than 60%.

The temperature is generally between 210 and 320° C. and preferably between 220 and 290° C. The temperature employed must be sufficient to maintain the gasoline to be treated in the vapor phase in the reactor. In the case where the hydrodesulfurization stage a) is carried out in several reactors in series, the temperature of each reactor is generally greater by at least 5° C., preferably by at least 10° C. and very preferably by at least 30° C. than the temperature of the reactor which precedes it.

The operating pressure of this stage is generally between 1 and 4 MPa and preferably between 1.5 and 3 MPa.

The amount of catalyst employed in each reactor is generally such that the ratio of the flow rate of gasoline to be treated, expressed in m³ per hour at standard conditions, per m³ of catalyst (also called space velocity) is between 1 and 10 h⁻¹ and preferably between 2 and 8 h⁻¹.

The hydrogen flow rate is generally such that the ratio of the hydrogen flow rate, expressed in normal m³ per hour (Nm³/h), to the flow rate of feedstock to be treated, expressed in m³ per hour at standard conditions (15° C., 0.1 MPa), is between 100 and 600 Nm³/m³, preferably between 200 and 500 Nm³/m³. Normal m³ is understood to mean the amount of gas in a volume of 1 m³ at 0° C. and 0.1 MPa.

The hydrogen required for this stage can be fresh hydrogen or recycled hydrogen, preferably freed from $H_2S$, or a mixture of fresh hydrogen and of recycled hydrogen. Preferably, fresh hydrogen will be used.

The degree of desulfurization of stage a), which depends on the sulfur content of the feedstock to be treated, is generally greater than 50% and preferably greater than 70%, so that the product resulting from stage a) contains less than 100 ppm by weight of sulfur and preferably less than 50 ppm by weight of sulfur.

The catalyst used in stage a) must exhibit a good selectivity with regard to the hydrodesulfurization reactions, in comparison with the reaction for the hydrogenation of olefins.

The hydrodesulfurization catalyst of stage a) comprises an oxide support and an active phase comprising a metal from group VIB and a metal from group VIII and optionally phosphorus and/or an organic compound as described below.

The metal from group VIB present in the active phase of the catalyst is preferentially chosen from molybdenum and tungsten. The metal from group VIII present in the active phase of the catalyst is preferentially chosen from cobalt, nickel and the mixture of these two elements. The active phase of the catalyst is preferably chosen from the group formed by the combination of the elements nickel-molybdenum, cobalt-molybdenum and nickel-cobalt-molybdenum and very preferably the active phase consists of cobalt and molybdenum.

The content of metal from group VIII is between 0.1% and 10% by weight of oxide of the metal from group VIII, with respect to the total weight of the catalyst, preferably between 0.6% and 8% by weight, preferably between 2% and 7% by weight, very preferably between 2% and 6% by weight and more preferably still between 2.5% and 6% by weight.

The content of metal from group VIB is between 1% and 20% by weight of oxide of the metal from group VIB, with respect to the total weight of the catalyst, preferably between 2% and 18% by weight, very preferably between 3% and 16% by weight.

The metal from group VIII to metal from group VIB molar ratio of the catalyst is generally between 0.1 and 0.8, preferably between 0.2 and 0.6.

In addition, the catalyst exhibits a density of metal from group VIB, expressed as number of atoms of said metal per unit area of the catalyst, which is between 0.5 and 30 atoms of metal from group VIB per nm² of catalyst, preferably between 2 and 25, more preferably still between 3 and 15. The density of metal from group VIB, expressed as number of atoms of metal from group VIB per unit area of the catalyst (number of atoms of metal from group VIB per nm² of catalyst), is calculated, for example, from the following relationship:

$$d \text{ (metal from group } VIB) = \frac{(X \times N_A)}{(100 \times 10^{18} \times S \times M_M)}$$

with:

$X$=% by weight of metal from group VIB;
$N_A$=Avogadro's number, equal to $6.022 \times 10^{23}$;
$S$=Specific surface area of the catalyst (m²/g), measured according to the standard ASTM D3663;
$M_M$=Molar mass of the metal from group VIB (for example 95.94 g/mol for molybdenum).

For example, if the catalyst contains 20% by weight of molybdenum oxide $MoO_3$ (i.e. 13.33% by weight of Mo) and has a specific surface area of 100 m²/g, the density d(Mo) is equal to:

$$d(Mo) = \frac{(13.33 \times N_A)}{(100 \times 10^{18} \times 100 \times 96)} = 8.4 \text{ atoms of Mo/nm}^2 \text{ of catalyst}$$

Optionally, the catalyst can additionally exhibit a phosphorus content generally of between 0.3% and 10% by weight of $P_2O_5$, with respect to the total weight of catalyst, preferably between 0.5% and 5% by weight, very preferably between 1% and 3% by weight. For example, the phosphorus present in the catalyst is combined with the metal from group VIB and optionally also with the metal from group VIII in the form of heteropolyanions.

Furthermore, the phosphorus/(metal from group VIB) molar ratio is generally between 0.1 and 0.7, preferably between 0.2 and 0.6, when phosphorus is present.

Preferably, the catalyst is characterized by a specific surface area of between 5 and 400 m²/g, preferably of between 10 and 250 m²/g, preferably of between 20 and 200 m²/g, very preferably of between 30 and 180 m²/g. The specific surface area is determined in the present invention by the BET method according to the standard ASTM D3663, as described in the work by Rouquerol F., Rouquerol J. and Singh K., *Adsorption by Powders & Porous Solids: Principle, Methodology and Applications*, Academic Press, 1999, for example by means of an Autopore III™ model device of the Micromeritics™ brand.

The total pore volume of the catalyst is generally between 0.4 cm³/g and 1.3 cm³/g, preferably between 0.6 cm³/g and 1.1 cm³/g. The total pore volume is measured by mercury porosimetry according to the standard ASTM D4284 with a wetting angle of 140°, as described in the same work.

The tapped packing density (TPD) of the catalyst is generally between 0.4 and 0.7 g/ml, preferably between 0.45 and 0.69 g/ml. The TPD measurement consists in introducing the catalyst into a measuring cylinder, the volume of which has been determined beforehand, and then, by vibration, in tapping it until a constant volume is obtained. The bulk density of the tapped product is calculated by comparing the mass introduced and the volume occupied after tapping.

Advantageously, the hydrodesulfurization catalyst, before sulfidation, exhibits a mean pore diameter of greater than 20 nm, preferably of greater than 25 nm, indeed even 30 nm and often of between 20 and 140 nm, preferably between 20 and 100 nm, and very preferentially between 25 and 80 nm. The pore diameter is measured by mercury porosimetry according to the standard ASTM D4284 with a wetting angle of 140°.

The catalyst can be in the form of cylindrical or multilobe (trilobe, quadrilobe, and the like) extrudates with a small diameter, or of spheres.

The oxide support of the catalyst is usually a porous solid chosen from the group consisting of: aluminas, silica, silica-aluminas and also titanium or magnesium oxides, used alone or as a mixture with alumina or silica-alumina. It is preferably chosen from the group consisting of silica, the family of the transition aluminas and silica-aluminas; very preferably, the oxide support is constituted essentially of alumina, that is to say that it comprises at least 51% by weight, preferably at least 60% by weight, very preferably at least 80% by weight, indeed even at least 90% by weight, of alumina. It preferably consists solely of alumina. Preferably, the oxide support of the catalyst is a "high temperature" alumina, that is to say which contains theta-, delta-, kappa- or alpha-phase aluminas, alone or as a mixture, and an amount of less than 20% of gamma-, chi- or eta-phase alumina.

The catalyst can also additionally comprise at least one organic compound containing oxygen and/or nitrogen and/or sulfur before sulfidation.

A very preferred embodiment of the invention corresponds to the use, for stage a), of a catalyst comprising alumina and an active phase comprising cobalt, molybdenum and optionally phosphorus, said catalyst containing a content by weight, with respect to the total weight of catalyst, of cobalt oxide, in CoO form, of between 0.1% and 10%, a content by weight, with respect to the total weight of catalyst, of molybdenum oxide, in $MoO_3$ form, of between 1% and 20%, a cobalt/molybdenum molar ratio of between 0.1 and 0.8, and a content by weight, with respect to the total weight of catalyst, of phosphorus oxide in $P_2O_5$ form of between 0.3% and 10% when phosphorus is present, said catalyst having a specific surface area of between 30 and 180 $m^2/g$. According to one embodiment, the active phase consists of cobalt and molybdenum. According to another embodiment, the active phase consists of cobalt, molybdenum and phosphorus.

Description of the Finishing Hydrodesulfurization Stage b)

During the hydrodesulfurization stage a), a large part of the sulfur compounds is converted into $H_2S$. The remaining sulfur compounds are essentially refractory sulfur compounds and the recombinant mercaptans resulting from the addition of $H_2S$ formed in stage a) to the monoolefins present in the feedstock.

The "finishing" hydrodesulfurization stage b), which is carried out at a higher temperature than that of stage a) and in the presence of a particular catalyst, is principally implemented for reducing the content of recombinant mercaptans. Specifically, by using a higher temperature in this stage compared to the temperature of stage a), the formation of olefins and of $H_2S$ will be promoted by the thermodynamic equilibrium. Stage b) also makes it possible to hydrodesulfurize the more refractory sulfur compounds.

The hydrodesulfurization stage b) consists in bringing the effluent from stage a) into contact optionally with an addition of hydrogen, in one or more hydrodesulfurization reactors, containing one or more catalysts suitable for carrying out the hydrodesulfurization.

The hydrodesulfurization stage b) is carried out without significant hydrogenation of the olefins. The degree of hydrogenation of the olefins of the catalyst of the hydrodesulfurization stage b) is generally less than 5% and more generally still less than 2%.

The temperature of this stage is generally between 280 and 400° C., more preferably between 290 and 380° C. and very preferably between 300 and 360° C. The temperature of this stage b) is generally greater by at least 5° C., preferably by at least 10° C. and very preferably by at least 30° C. than the temperature of stage a).

The operating pressure of this stage is generally between 0.5 and 5 MPa and preferably between 1 and 3 MPa.

The amount of catalyst employed in each reactor is generally such that the ratio of the flow rate of gasoline to be treated, expressed in $m^3$ per hour at standard conditions, per $m^3$ of catalyst (also called space velocity) is between 1 and 10 $h^{-1}$ and preferably between 2 and 8 $h^{-1}$.

Preferably, the hydrogen flow rate is subject and equal to the amount injected in stage a) decreased by the hydrogen consumed in stage a). The hydrogen flow rate is generally such that the ratio of the hydrogen flow rate, expressed in normal $m^3$ per hour ($Nm^3/h$), to the flow rate of feedstock to be treated, expressed in $m^3$ per hour at standard conditions (15° C., 0.1 MPa), is between 100 and 600 $Nm^3/m^3$, preferably between 200 and 500 $Nm^3/m^3$.

The degree of desulfurization of stage b), which depends on the sulfur content of the feedstock to be treated, is generally greater than 50% and preferably greater than 70%, so that the product resulting from stage b) contains less than 60 ppm by weight of sulfur and preferably less than 40 ppm by weight of sulfur.

The hydrodesulfurization stages a) and b) may be carried out either in a single reactor containing both catalysts or in at least two different reactors. When stages a) and b) are carried out using two reactors, these two reactors are placed in series, with the second reactor treating all of the effluent exiting from the first reactor (without separation of the liquid and of the gas between the first and second reactor).

The catalyst of stage b) is different in nature and/or in composition from that used in stage a). The catalyst of stage b) is in particular a very selective hydrodesulfurization catalyst: it makes it possible to hydrodesulfurize without hydrogenating the olefins and thus to maintain the octane number.

The catalyst which may be suitable for this stage b) of the process according to the invention, without this list being limiting, is a catalyst comprising an oxide support and an active phase consisting of at least one metal from group VIII, and preferably chosen from the group formed by nickel, cobalt and iron. These metals can be used alone or in combination. Preferably, the active phase consists of a metal from group VIII, preferably nickel. Particularly preferably, the active phase consists of nickel.

The content of metal from group VIII is between 1% and 60% by weight of oxide of the metal from group VIII, with respect to the total weight of the catalyst, preferably between 5% and 30% by weight, very preferably between 5% and 20% by weight.

Preferably, the catalyst is characterized by a specific surface area of between 5 and 400 $m^2/g$, preferably of between 10 and 250 $m^2/g$, preferably of between 20 and 200 $m^2/g$, very preferably of between 30 and 180 $m^2/g$. The specific surface area is determined in the present invention by the BET method according to the standard ASTM D3663, as described in the work by Rouquerol F., Rouquerol J. and Singh K., *Adsorption by Powders & Porous Solids: Principle, Methodology and Applications*, Academic Press, 1999, for example by means of an Autopore III™ model device of the Micromeritics™ brand.

The pore volume of the catalyst is generally between 0.4 $cm^3/g$ and 1.3 $cm^3/g$, preferably between 0.6 $cm^3/g$ and 1.1 $cm^3/g$. The total pore volume is measured by mercury porosimetry according to the standard ASTM D4284 with a wetting angle of 140°, as described in the same work.

The tapped packing density (TPD) of the catalyst is generally between 0.4 and 0.7 g/ml, preferably between 0.45 and 0.69 g/ml.

The TPD measurement consists in introducing the catalyst into a measuring cylinder, the volume of which has been determined beforehand, and then, by vibration, in tapping it until a constant volume is obtained. The bulk density of the tapped product is calculated by comparing the mass introduced and the volume occupied after tapping.

Advantageously, the catalyst of stage b), before sulfidation, exhibits a mean pore diameter of greater than 20 nm, preferably of greater than 25 nm, indeed even 30 nm and often of between 20 and 140 nm, preferably between 20 and 100 nm, and very preferentially between 25 and 80 nm. The pore diameter is measured by mercury porosimetry according to the standard ASTM D4284 with a wetting angle of 140°.

The catalyst can be in the form of cylindrical or multilobe (trilobe, quadrilobe, and the like) extrudates with a small diameter, or of spheres.

The oxide support of the catalyst is usually a porous solid chosen from the group consisting of: aluminas, silica, silica-aluminas and also titanium or magnesium oxides, used alone or as a mixture with alumina or silica-alumina. It is preferably chosen from the group consisting of silica, the family of the transition aluminas and silica-aluminas; very preferably, the oxide support is constituted essentially of alumina, that is to say that it comprises at least 51% by weight, preferably at least 60% by weight, very preferably at least 80% by weight, indeed even at least 90% by weight, of alumina. It preferably consists solely of alumina. Preferably, the oxide support of the catalyst is a "high temperature" alumina, that is to say which contains theta-, delta-, kappa- or alpha-phase aluminas, alone or as a mixture, and an amount of less than 20% of gamma-, chi- or eta-phase alumina.

A very preferred embodiment of the invention corresponds to the use, for stage b), of a catalyst consisting of alumina and of nickel, said catalyst containing a content by weight, with respect to the total weight of catalyst, of nickel oxide, in NiO form, of between 5% and 20%, said catalyst having a specific surface area of between 30 and 180 $m^2/g$.

The catalyst of the hydrodesulfurization stage b) is characterized by a hydrodesulfurization catalytic activity generally of between 1% and 90%, preferentially of between 1% and 70% and very preferably of between 1% and 50% of the catalytic activity of the catalyst of the hydrodesulfurization stage a).

Description of the $H_2S$ Separation Stage (Stage c)

This stage is carried out in order to separate the excess hydrogen and also the $H_2S$ formed during stages a) and b). Any method known to a person skilled in the art can be envisaged.

According to a first embodiment, after the hydrodesulfurization stages a) and b), the effluent is cooled to a temperature generally of less than 80° C. and preferably of less than 60° C. in order to condense the hydrocarbons. The gas and liquid phases are subsequently separated in a separation drum. The liquid fraction, which contains the desulfurized gasoline and also a fraction of the $H_2S$ dissolved, is sent to a stabilization column or debutanizer. This column comprises a top cut, consisting essentially of residual $H_2S$ and of hydrocarbon compounds having a boiling point less than or equal to that of butane, and a bottom cut freed from $H_2S$, called stabilized gasoline, containing the compounds having a boiling point greater than that of butane.

According to a second embodiment, after the condensation stage, the liquid fraction which contains the desulfurized gasoline and also a fraction of the $H_2S$ dissolved is sent to a stripping section, while the gaseous fraction, consisting mainly of hydrogen and of $H_2S$, is sent to a purification section. The stripping can be carried out by heating the hydrocarbon fraction, alone or with an injection of hydrogen or steam, in a distillation column in order to extract, at the top, the light compounds which were entrained by dissolution in the liquid fraction and also the residual dissolved $H_2S$. The temperature of the stripped gasoline recovered at the column bottom is generally between 120° C. and 250° C.

Preferably, the separation stage c) is carried out in a stabilization column or debutanizer. This is because a stabilization column makes it possible to separate the $H_2S$ more efficiently than a stripping section.

Stage c) is preferably carried out in order for the sulfur in the form of $H_2S$ remaining in the desulfurized gasoline, before the gentle hydrodesulfurization stage d), to represent less than 30%, preferably less than 20% and more preferably less than 10% of the total sulfur present in the treated hydrocarbon fraction.

Description of the Gentle Hydrodesulfurization Stage d)

This hydrodesulfurization stage consists in bringing the effluent depleted in $H_2S$ resulting from stage c), hydrogen and a hydrodesulfurization catalyst into contact in at least one reactor and with relatively mild operating conditions. Specifically, the recombinant mercaptans remaining in the effluent after stage b) are compounds that are relatively easy to hydrodesulfurize compared to the more refractory compounds removed during stage b).

The term "mild conditions" is understood in particular to mean a $H_2$ flow rate/feedstock flow rate ratio that is lower than the ratio of stages a) and b), preferably combined with a temperature lower than the temperature of stage b) and possibly lower than that of stage a). Specifically, this low $H_2$ flow rate/feedstock flow rate ratio makes it possible to hydrodesulfurize the residual mercaptans without, however, hydrogenating the olefins. Just as with the previous hydrodesulfurization stages a) and b), stage d) is implemented with the aim of carrying out a hydrodesulfurization selectively, that is to say with a degree of hydrogenation of the monoolefins of less than 80%, preferably of less than 70% and very preferably of less than 60%.

The operating pressure of this stage is generally between 0.5 and 5 MPa and preferably between 1 and 3 MPa. The temperature is generally between 150 and 330° C. and preferably between 180 and 300° C. The temperature of this stage d) is generally lower by at least 5° C., preferably by at least 10° C. and very preferably by at least 15° C. than the temperature of stage b).

The amount of catalyst employed in stage d) is generally such that the ratio of the flow rate of gasoline to be treated, expressed in $m^3$ per hour at standard conditions, per $m^3$ of catalyst (also called space velocity) is between 1 and 10 $h^{-1}$ and preferably between 2 and 8 $h^{-1}$.

The ratio of the hydrogen flow rate to the flow rate of feedstock to be treated, also called $H_2/HC$ ratio, of stage d) is lower than the $H_2/HC$ ratio of stage a). The ratio of the hydrogen flow rate to the flow rate of feedstock to be treated is understood to mean the ratio at the inlet of the reactor of the stage concerned. The ratio or adjustment factor defined by $F=(H_2/HC_{inlet\ of\ the\ reactor\ of\ stage\ a})/(H_2/HC_{inlet\ of\ the\ reactor\ of\ stage\ d})$ is greater than or equal to 1.05, preferably greater than 1.1 and preferably between 1.1 and 6 and preferentially between 1.2 and 4.

The hydrogen flow rate of stage d) is generally such that the ratio of the hydrogen flow rate, expressed in normal $m^3$ per hour ($Nm^3/h$), to the flow rate of feedstock to be treated, expressed in $m^3$ per hour at standard conditions, is between 25 and 400 $Nm^3/m^3$, preferably between 40 and 250 $Nm^3/m^3$, and particularly preferably between 50 and 150 $Nm^3/m^3$.

The hydrogen required for this stage can be fresh hydrogen or recycled hydrogen, preferably freed from $H_2S$, or a mixture of fresh and recycled hydrogen. Preferably, fresh hydrogen will be used. This makes it possible to reduce the partial pressure of $H_2S$ at the inlet to stage d) and thus promotes the removal of the mercaptans in the form of olefins and $H_2S$.

According to one embodiment, the hydrogen can originate from a hydrogen feed dedicated to this stage, for example a hydrogen compressor.

According to another embodiment, and by virtue of the relatively low $H_2$ flow rate/feedstock flow rate ratio required in stage d), the hydrogen may originate from the hydrogen feed of stage a), which makes it possible to save on a hydrogen compressor.

The hydrodesulfurization catalysts suitable for this stage d) are catalysts exhibiting a good selectivity with regard to the hydrodesulfurization reactions in comparison with the reaction for the hydrogenation of olefins under mild operating conditions. The catalyst comprises an oxide support and an active phase comprising a metal from group VIB and a metal from group VIII or an active phase consisting of at least one metal from group VIII.

According to a first alternative form, the catalyst comprises an oxide support and an active phase comprising a metal from group VIB and a metal from group VIII. According to this alternative form, the hydrodesulfurization catalyst of stage d) is a catalyst such as the catalyst described for the hydrodesulfurization stage a). The catalyst of stage d) can be identical to or different from the catalyst of stage a). Preferably, the catalyst for stage d) does not comprise phosphorus. This is because the presence of phosphorus in the catalyst, known inter alia to stabilize the support at high temperature, is not obligatory under the mild operating conditions of stage d).

A very preferred embodiment of the invention corresponds to the use, for stage d), of a catalyst which consists of alumina and of a cobalt-molybdenum active phase, said catalyst containing a content by weight, with respect to the total weight of catalyst, of cobalt oxide, in CoO form, of between 0.1% and 10%, a content by weight, with respect to the total weight of catalyst, of molybdenum oxide, in $MoO_3$ form, of between 1% and 20%, and a cobalt/molybdenum molar ratio of between 0.1 and 0.8, said catalyst having a specific surface area of between 30 and 180 $m^2/g$.

According to a second alternative form, the catalyst comprises an oxide support and an active phase consisting of at least one metal from group VIII. According to this alternative form, the hydrodesulfurization catalyst of stage d) is a catalyst such as the catalyst described for the hydrodesulfurization stage b). The catalyst of stage d) can be identical to or different from the catalyst of stage b).

A very preferred embodiment of the invention corresponds to the use, for stage d), of a catalyst consisting of alumina and of nickel, said catalyst containing a content by weight, with respect to the total weight of catalyst, of nickel oxide, in NiO form, of between 5% and 20%, said catalyst having a specific surface area of between 30 and 180 $m^2/g$.

The degree of removal of the mercaptans is generally greater than 50% and preferably greater than 70%, so that the product resulting from stage d) contains less than 10 ppm sulfur and preferably less than 5 ppm sulfur resulting from the recombinant mercaptans, with respect to the total weight of the feedstock.

The degree of hydrogenation of the olefins of stage d) is generally less than 5% and preferably less than 2%.

Description of the Preparation of the Catalysts and of the Sulfidation

The preparation of the catalysts of stages a), b) or d) is known and generally comprises a stage of impregnation of the metals from group VIII and from group VIB, when it is present, and optionally of phosphorus and/or of the organic compound on the oxide support, followed by a drying operation and then by an optional calcination making it possible to obtain the active phase in their oxide forms. Before its use in a process for the hydrodesulfurization of a sulfur-containing olefinic gasoline cut, the catalysts are generally subjected to a sulfidation in order to form the active entity as described below.

The impregnation stage can be carried out either by slurry impregnation, or by impregnation in excess, or by dry impregnation, or by any other means known to a person skilled in the art. The impregnation solution is chosen so as to be able to dissolve the metal precursors in the desired concentrations.

Use may be made, by way of example, among the sources of molybdenum, of the oxides and hydroxides, molybdic acids and salts thereof, in particular the ammonium salts, such as ammonium molybdate, ammonium heptamolybdate, phosphomolybdic acid ($H_3PMo_{12}O_{40}$), and salts thereof, and optionally silicomolybdic acid ($H_4SiMo_{12}O_{40}$) and salts thereof. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to a person skilled in the art. For example, use may be made, among the sources of tungsten, of the oxides and hydroxides, tungstic acids and salts thereof, in particular the ammonium salts, such as ammonium tungstate, ammonium metatungstate, phosphotungstic acid and salts thereof, and optionally silicotungstic acid ($H_4SiW_{12}O_{40}$) and salts thereof. The sources of tungsten can also be any heteropolycompound of Keggin, lacunary Keggin, substituted Keggin or Dawson type, for example. Use is preferably made of the oxides and the ammonium salts, such as ammonium metatungstate, or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example.

The preferred phosphorus precursor is orthophosphoric acid $H_3PO_4$, but salts and esters thereof, such as ammonium phosphates, are also suitable. The phosphorus can also be introduced at the same time as the element(s) from group VIB in the form of Keggin, lacunary Keggin, substituted Keggin or Strandberg-type heteropolyanions.

After the impregnation stage, the catalyst is generally subjected to a drying stage at a temperature of less than 200° C., advantageously of between 50° C. and 180° C., preferably between 70° C. and 150° C., very preferably between 75° C. and 130° C. The drying stage is preferentially carried out under an inert atmosphere or under an oxygen-containing atmosphere. The drying stage can be carried out by any technique known to a person skilled in the art. It is advantageously carried out at atmospheric pressure or at reduced pressure. Preferably, this stage is carried out at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or of air. Preferably, the drying stage has a duration of between 5 minutes and 15 hours, preferably between 30 minutes and 12 hours.

According to an alternative form of the invention, the catalyst has not undergone calcination during its preparation, that is to say that the impregnated catalytic precursor has not been subjected to a stage of heat treatment at a temperature of greater than 200° C. under an inert atmosphere or under an oxygen-containing atmosphere, in the presence or absence of water.

According to another alternative form of the invention, which is preferred, the catalyst has undergone a calcination stage during its preparation, that is to say that the impregnated catalytic precursor has been subjected to a stage of heat treatment at a temperature of between 250° C. and 1000° C. and preferably between 200° C. and 750° C., for a period of time typically of between 15 minutes and 10 hours, under an inert atmosphere or under an oxygen-containing atmosphere, in the presence or absence of water.

Before bringing into contact with the feedstock to be treated in a process for the hydrodesulfurization of gasolines, the catalysts of the process according to the invention generally undergo a sulfidation stage. The sulfidation is preferably carried out in a sulforeducing medium, that is to say in the presence of $H_2S$ and of hydrogen, in order to transform the metal oxides into sulfides, such as, for example, $MoS_2$, $Co_3S_8$ or $Ni_3S_2$. The sulfidation is carried out by injecting, onto the catalyst, a stream containing $H_2S$ and hydrogen, or else a sulfur compound capable of decomposing to give $H_2S$ in the presence of the catalyst and of hydrogen. Polysulfides, such as dimethyl disulfide (DMDS), are $H_2S$ precursors commonly used to sulfide catalysts. The sulfur can also originate from the feedstock. The temperature is adjusted in order for the $H_2S$ to react with the metal oxides to form metal sulfides. This sulfidation can be carried out in situ or ex situ (inside or outside the reactor) of the reactor of the process according to the invention at temperatures of between 200° C. and 600° C. and more preferentially between 300° C. and 500° C.

The degree of sulfidation of the metals constituting the catalysts is at least equal to 60%, preferably at least equal to 80%. The sulfur content in the sulfided catalyst is measured by elemental analysis according to ASTM D5373. A metal is regarded as sulfided when the overall degree of sulfidation, defined by the molar ratio of the sulfur (S) present on the catalyst to said metal, is at least equal to 60% of the theoretical molar ratio corresponding to the complete sulfidation of the metal(s) under consideration. The overall degree of sulfidation is defined by the following equation:

$$(S/metal)_{catalyst} \geq 0.6 \times (S/metal)_{theoretical}$$

in which:

$(S/metal)_{catalyst}$ is the molar ratio of sulfur (S) to metal present on the catalyst $(S/metal)_{theoretical}$ is the molar ratio of sulfur to metal corresponding to the complete sulfidation of the metal to give sulfide.

This theoretical molar ratio varies according to the metal under consideration:

$(S/Fe)_{theoretical}=1$
$(S/Co)_{theoretical}=8/9$
$(S/Ni)_{theoretical}=2/3$
$(S/Mo)_{theoretical}=2/1$
$(S/W)_{theoretical}=2/1$ When the catalyst comprises several metals, the molar ratio of S present on the catalyst to the combined metals also has to be at least equal to 60% of the theoretical molar ratio corresponding to the complete sulfidation of each metal to give sulfide, the calculation being carried out in proportion to the relative molar fractions of each metal.

For example, for a catalyst comprising molybdenum and nickel with a respective molar fraction of 0.7 and 0.3, the minimum molar ratio (S/Mo+Ni) is given by the relationship:

$$(S/Mo+Ni)_{catalyst}=0.6 \times \{(0.7 \times 2)+(0.3 \times (2/3))\}$$

Description of the $H_2S$ Separation Stage (Stage e)

At the end of stage d), the gasoline treated under the conditions set out hereinabove thus exhibits a reduced content of mercaptans. Specifically, the latter have been converted by hydrodesulfurization to form $H_2S$.

In accordance with the invention, a stage of separation e) of the $H_2S$ formed and present in the effluent resulting from stage d) is performed. Any method known to a person skilled in the art can be envisaged.

According to a first embodiment, after the hydrodesulfurization stage d), the effluent is cooled to a temperature generally of less than 80° C. and preferably of less than 60° C. in order to condense the hydrocarbons. The gas and liquid phases are subsequently separated in a separation drum. The liquid fraction, which contains the desulfurized gasoline and also a fraction of the $H_2S$ dissolved, is sent to a stabilization column or debutanizer. This column separates a top cut, consisting essentially of residual $H_2S$ and of hydrocarbon compounds having a boiling point less than or equal to that of butane, and a bottom cut freed from $H_2S$, called stabilized gasoline, containing the compounds having a boiling point greater than that of butane.

According to a second embodiment, after the condensation stage, the liquid fraction which contains the desulfurized gasoline and also a fraction of the $H_2S$ dissolved is sent to a stripping section, while the gaseous fraction, consisting mainly of hydrogen and of $H_2S$, is sent to a purification section. The stripping can be carried out by heating the hydrocarbon fraction, alone or with an injection of hydrogen or steam, in a distillation column in order to extract, at the top, the light compounds which were entrained by dissolution in the liquid fraction and also the residual dissolved $H_2S$. The temperature of the stripped gasoline recovered at the column bottom is generally between 120° C. and 250° C.

Preferably, the separation stage e) is carried out in a stabilization column or debutanizer. This is because a stabilization column makes it possible to separate the $H_2S$ more efficiently than a stripping section.

Stage e) is preferably carried out in order for the sulfur in the form of $H_2S$ remaining in the effluent from stage d) to represent less than 30%, preferably less than 20% and more preferably less than 10% of the total sulfur present in the treated hydrocarbon fraction.

It should be noted that the hydrodesulfurization stage d) and $H_2S$ separation stage e) can be carried out simultaneously by means of a catalytic column equipped with a catalytic bed containing the hydrodesulfurization catalyst. Preferably, the catalytic distillation column comprises two beds of hydrodesulfurization catalyst and the effluent from stage c) is sent into the column between the two beds of catalyst.

Schemes which can be Employed within the Scope of the Invention

Different schemes can be employed in order to produce, at a lower cost, a desulfurized gasoline having a reduced content of mercaptans. The choice of the optimum scheme depends in fact on the characteristics of the gasolines to be treated and to be produced and also on the constraints specific to each refinery.

The schemes described below are given by way of illustration without limitation.

According to a first alternative form, a stage of distillation of the gasoline to be treated is carried out in order to separate two cuts (or fractions), namely a light cut and a heavy cut, and the heavy cut is treated according to the process of the invention. The light cut generally has a boiling point range of less than 100° C. and the heavy cut a temperature range of greater than 65° C. This first alternative form has the advantage of not hydrotreating the light cut which is rich in olefins and generally comprises a low sulfur content, which makes it possible to limit the loss of octane through hydrogenation of the olefins.

According to a second alternative form, the gasoline to be treated is subjected, before the process according to the invention, to a preliminary stage consisting of a selective hydrogenation of the diolefins present in the feedstock, as described in the patent application EP 1 077 247.

The gasoline to be treated is treated beforehand in the presence of hydrogen and of a selective hydrogenation catalyst so as to at least partially hydrogenate the diolefins and to carry out a reaction for increasing the molecular weight of a portion of the light mercaptan (RSH) compounds present in the feedstock to give thioethers, by reaction with olefins.

To this end, the gasoline to be treated is sent to a selective hydrogenation catalytic reactor containing at least one fixed or moving bed of catalyst for the selective hydrogenation of the diolefins and for increasing the molecular weight of the light mercaptans. The reaction for the selective hydrogenation of the diolefins and for increasing the molecular weight of the light mercaptans is preferentially carried out on a sulfided catalyst comprising at least one element from group VIII and optionally at least one element from group VIB and an oxide support. The element from group VIII is preferably chosen from nickel and cobalt and in particular nickel. The element from group VIB, when it is present, is preferably chosen from molybdenum and tungsten and very preferably molybdenum.

The oxide support of the catalyst is preferably chosen from alumina, nickel aluminate, silica, silicon carbide or a mixture of these oxides. Use is preferably made of alumina and more preferably still of high-purity alumina. According to a preferred embodiment, the selective hydrogenation catalyst contains nickel at a content by weight of nickel oxide, in NiO form, of between 1% and 12%, and molybdenum at a content by weight of molybdenum oxide, in $MoO_3$ form, of between 6% and 18% and a nickel/molybdenum molar ratio of between 0.3 and 2.5, the metals being deposited on a support consisting of alumina. The degree of sulfidation of the metals constituting the catalyst is preferably greater than 60%.

During the optional selective hydrogenation stage, the gasoline is brought into contact with the catalyst at a temperature of between 50 and 250° C., preferably between 80 and 220° C. and more preferably still between 90 and 200° C., with a liquid space velocity (LHSV) of between 0.5 $h^{-1}$ and 20 $h^{-1}$, the unit of the liquid space velocity being the liter of feedstock per liter of catalyst and per hour (l/l/h). The pressure is between 0.4 and 5 MPa, preferably between 0.6 and 4 MPa and more preferably still between 1 and 3 MPa. The optional selective hydrogenation stage is typically carried out with a ratio of the hydrogen flow rate, expressed in normal $m^3$ per hour, to the flow rate of feedstock to be treated, expressed in $m^3$ per hour at standard conditions, of between 2 and 100 $Nm^3/m^3$, preferably between 3 and 30 $Nm^3/m^3$.

After selective hydrogenation, the content of diolefins, determined via the maleic anhydride value (MAV), according to the UOP 326 method, is generally reduced to less than 6 mg maleic anhydride/g, indeed even less than 4 mg MA/g and more preferably less than 2 mg MA/g. In some cases, there may be obtained less than 1 mg MA/g.

The selectively hydrogenated gasoline is subsequently distilled into at least two cuts, a light cut and a heavy cut and optionally an intermediate cut. In the case of the fractionation into two cuts, the heavy cut is treated according to the process of the invention. In the case of the fractionation into three cuts, the intermediate and heavy cuts can be treated separately by the process according to the invention.

It should be noted that it is possible to envisage carrying out the stages of hydrogenation of the diolefins and of fractionation in two or three cuts simultaneously by means of a catalytic distillation column which includes a distillation column equipped with at least one catalytic bed.

Other characteristics and advantages of the invention will now become apparent on reading the description which will follow, given solely by way of illustration and without limitation, and with reference to the appended FIG. 1.

With reference to FIG. 1, and according to an embodiment of the process according to the invention, the gasoline to be treated is sent via line 1 and hydrogen is sent via line 3 to a selective hydrogenation unit 2 (optional stage) in order to selectively hydrogenate the diolefins and to increase the molecular weight of the light mercaptans.

The effluent with a low content of diolefins and mercaptans is withdrawn from the reactor 2 via the line 4 and is sent to a fractionating column 5 (or splitter) configured to separate the gasoline into two cuts: a light gasoline cut 6 (or light gasoline) and a (first) heavy gasoline cut 7 which consists of the heavy fraction complementary to the light gasoline. The cut point for the light cut is generally carried out at a temperature of less than 100° C., and the cut point for the heavy cut is generally carried out at a temperature of greater than 65° C. The final boiling point of the light cut is chosen so as to provide a light gasoline cut having a low content of sulfur (total sulfur content typically less than 30 ppm by weight and preferably less than 10 ppm by weight) without requiring a later hydrodesulfurization stage.

Then, the heavy gasoline cut is sent via the line 7 and hydrogen is sent via the line 8 to the hydrodesulfurization unit 9 of stage a). The hydrodesulfurization unit 9 of stage a) is, for example, a reactor containing a supported hydrodesulfurization catalyst based on a metal from group VIII and VIB in a fixed bed or in a fluidized bed; preferably, a fixed bed reactor is used. The reactor is operated under operating conditions and in the presence of a hydrodesulfurization catalyst as described above to decompose the sulfur compounds and to form hydrogen sulfide ($H_2S$). During the hydrodesulfurization in stage a), recombinant mercaptans are formed by addition of $H_2S$ formed to the olefins. The effluent from the hydrodesulfurization unit 9 is subsequently introduced into the "finishing" hydrodesulfurization unit 11 via the line 10 without removal of the $H_2S$ formed. The hydrodesulfurization unit 11 of stage b) is, for example, a reactor containing a hydrodesulfurization catalyst in a fixed bed or in a fluidized bed; preferably, a fixed bed reactor is used. The unit 11 is operated at a higher temperature than the unit 9 and in the presence of a selective catalyst comprising an oxide support and an active phase consisting of at least one metal from group VIII to decompose, at least in part, the recombinant mercaptans into olefins and into $H_2S$. It also makes it possible to hydrodesulfurize the more refractory sulfur compounds.

An effluent (gasoline) containing $H_2S$ is withdrawn from said hydrodesulfurization reactor 11 via the line 12. The effluent subsequently undergoes a stage of removal of the $H_2S$ (stage c)) which consists, in the embodiment of FIG. 1, in treating the effluent by condensation by introducing the effluent from stage b) via the line 12 into a separation drum 13 in order to withdraw a gas phase containing $H_2S$ and hydrogen via the line 14 and a liquid fraction. The liquid fraction, which contains the desulfurized gasoline and also a fraction of the $H_2S$ dissolved, is sent via the line 15 to a stabilization column or debutanizer 16 in order to separate, at the top of the column via the line 17, a stream containing $C4^-$ hydrocarbons and the residual $H_2S$ and, at the bottom of the column via the line 18, a "stabilized" gasoline containing the compounds having a greater boiling point than that of butane.

The stabilized gasoline is sent via the line 18 into a hydrodesulfurization unit 19 of stage d) in order to reduce the content of residual mercaptans in the stabilized gasoline by hydrodesulfurization under mild operating conditions. As specified above, the unit 19 employs mild operating conditions, in particular a low $H_2$ flow rate/feedstock flow rate ratio, in the presence of a suitable hydrodesulfurization catalyst. Fresh hydrogen can be supplied via the line 20. By virtue of the relatively low $H_2$ flow rate/feedstock flow rate ratio required in stage d), the hydrogen needed for stage d) in unit 19 may also be taken directly from the hydrogen feed of unit 9 via the line 21. This makes it possible to save on a hydrogen compressor.

The effluent from stage d) subsequently undergoes a stage of removal of the $H_2S$ (stage e)) which consists, in the embodiment of FIG. 1, in treating the effluent by condensation by introducing the effluent from stage d) via the line 22 into a separation drum 23 in order to withdraw a gas phase containing $H_2S$ and hydrogen via the line 24 and a liquid fraction via the line 25. The liquid fraction, which contains the desulfurized gasoline and also a fraction of the $H_2S$ dissolved, is sent via the line 25 to a stabilization column or debutanizer 26 in order to separate, at the top of the column via the line 27, a stream containing C4⁻ hydrocarbons and the residual $H_2S$ and, at the bottom of the column via the line 28, a gasoline which exhibits contents of mercaptans and of total sulfur that are less than 5 ppm by weight and 10 ppm by weight, respectively.

EXAMPLES

Example 1: Pretreatment of the FCC Gasoline Feedstock by Selective Hydrogenation (According to the Prior Art)

Figure 2:
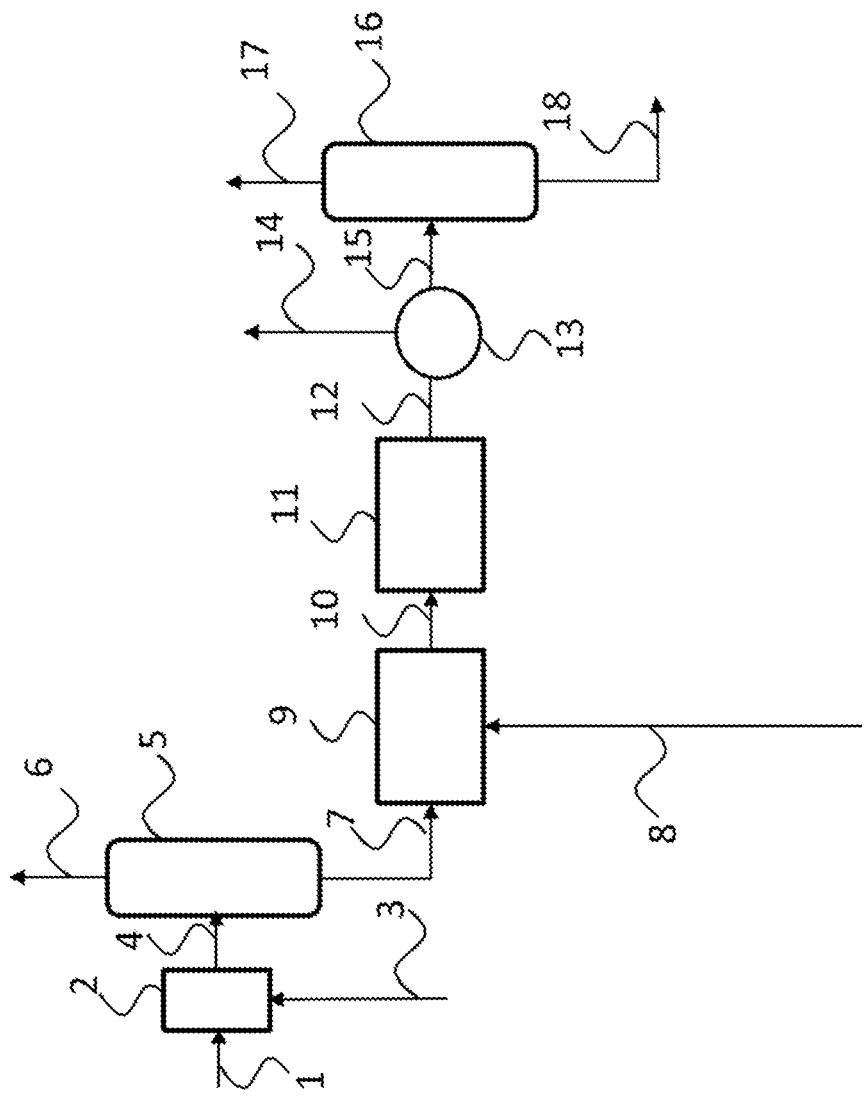
FIG. 2 illustrates a process according to the prior art.

Table 1 gives the characteristics of an FCC gasoline treated by the process according to FIG. 2 of the prior art (EP 1 077 247).

The FCC gasoline (line 1) is treated in the selective hydrogenation reactor 2 in the presence of a catalyst A (optional stage). The catalyst A is a catalyst of NiMo type on gamma-alumina. The metal contents are respectively 7% by weight NiO and 11% by weight $MoO_3$ with respect to the total weight of the catalyst, that is to say an Ni/Mo molar ratio of 1.2. The specific surface area of the catalyst is 230 m²/g. Prior to use thereof, the catalyst A is sulfided at atmospheric pressure in a sulfidation bed under an $H_2S/H_2$ mixture consisting of 15% by volume of $H_2S$ at 1 l/g·h of catalyst and at 400° C. for two hours. This protocol makes it possible to obtain a degree of sulfidation of greater than 80%.

The gasoline (line 1) is brought into contact with hydrogen (line 3) in a reactor which contains the catalyst A. This stage of the process implements the selective hydrogenation of the diolefins and the conversion (increase in the molecular weight) of a portion of the light mercaptan (RSH) compounds present in the feedstock. The content of diolefins is directly proportional to the MAV (maleic anhydride value). The diolefins are undesirable compounds since they are precursors to gums in gasolines.

The operating conditions employed in the selective hydrogenation reactor are: Temperature: 140° C., total pressure: 2.5 MPa, added $H_2$/gasoline feedstock volume ratio: 5 normal liters of hydrogen per liter of gasoline at standard conditions (vol/vol), hourly space velocity (HSV): 3 $h^{-1}$.

TABLE 1

Characteristics of the feedstock (1) and of the selective hydrogenation effluent (4).

|  |  | Line 1 Feedstock | Line 4 Selective hydrogenation effluent |
|---|---|---|---|
| Organic sulfur content | (ppm by weight S) | 438 | 435 |
| MAV | (mg/g) | 12 | 0.6 |
| Olefin content | (% by weight) | 31% | 31% |
| Simulated distillation |  |  |  |

TABLE 1-continued

Characteristics of the feedstock (1) and of the selective hydrogenation effluent (4).

|  |  | Line 1 Feedstock | Line 4 Selective hydrogenation effluent |
|---|---|---|---|
| (ASTM D2887) |  |  |  |
| 5% mass distilled | (° C.) | 23 | 23 |
| 50% mass distilled | (° C.) | 95 | 95 |
| 95% mass distilled | (° C.) | 180 | 180 |

The effluent from the selective hydrogenation stage (line 4) having a low content of conjugated diolefins (MAV=0.6 mg/g) and a low content of light sulfur compounds (the molecular weight of which was increased in the selective hydrogenation stage) is sent to a fractionating column (5) in order to separate at the top a light gasoline (line 6) and at the bottom of the column a first heavy gasoline cut (line 7). The characteristics of the light gasoline and of the first heavy gasoline cut are indicated in table 2. As indicated in table 2, the light gasoline obtained (line 6) has a low sulfur content (10 ppm by weight). The first heavy gasoline cut, which corresponds to approximately 72% by mass of the gasoline, has a high sulfur content (600 ppm) and requires additional treatment before being incorporated into the gasoline pool.

TABLE 2

Characteristics of the cuts: Light gasoline and first heavy gasoline cut

|  |  | Line 6 Light gasoline | Line 7 Heavy gasoline |
|---|---|---|---|
| Percentage by mass of the cut | % | 28 | 72 |
| Organic sulfur content | (ppm by weight S) | 10 | 600 |
| Olefin content | (% by weight) | 46% | 25% |

Example 2 (Comparative According to the Prior Art): Hydrodesulfurization of the First Heavy Gasoline Cut This example makes reference to the prior art (EP 1 077 247) and to FIG. 2. The first heavy gasoline cut (line 7) obtained in example 1 is mixed with hydrogen (line 8) and treated in a selective hydrodesulfurization unit (9), corresponding to a first hydrodesulfurization stage. The first hydrodesulfurization stage is conducted in the presence of a CoMo catalyst supported on alumina. The temperature is 268° C., the pressure is 2 MPa, the liquid space velocity (expressed in volume of liquid per volume of catalyst and per hour) is 3 $h^{-1}$, the ratio of the hydrogen flow rate to the feedstock flow rate is 250 normal m³ per m³ under standard conditions. The effluent from the reactor (line 10) is then reheated in an oven (not shown in the figure) and then introduced into a second reactor (11) containing a "finishing" catalyst. This finishing stage is conducted in the presence of an Ni catalyst supported on alumina. The temperature is 316° C., the pressure is 1.8 MPa, the liquid space velocity (expressed in volume of liquid per volume of catalyst and per hour) is 3 $h^{-1}$.

The effluent from the reactor 11 (line 12) is sent to a separation drum (13) in order to separate a gas phase containing $H_2S$ and hydrogen via the line 14 and a liquid fraction.

The liquid fraction, which contains the desulfurized gasoline and also a fraction of the $H_2S$ dissolved, is sent via the line 15 to a stabilization column or debutanizer (16) in order to separate, at the top of the column via the line 17, a stream containing C4⁻ hydrocarbons and the residual $H_2S$ and, at the bottom of the column via the line 18, a heavy "stabilized" gasoline obtained from the second reactor (11), the characteristics of which are illustrated in table 3. The loss of olefins is given in table 4.

TABLE 3

Characteristics of the heavy gasoline after the first and the second hydrodesulfurization stage

|  |  | Line 10 Hydrodesulfurized heavy gasoline First stage | Line 12 Hydrodesulfurized heavy gasoline Second stage |
|---|---|---|---|
| Organic sulfur content | (ppm S) | 21 | 10 |
| Olefin content | (% by weight) | 18.2 | 18.2 |

TABLE 4

Loss of olefins between the first heavy gasoline cut (line 7) and the gasoline obtained after the second hydrodesulfurization stage (line 12).

|  |  | Loss of olefins (absolute) |
|---|---|---|
| Loss of olefins | (% by weight) | 27.3 |

The process according to example 2 makes it possible to obtain a heavy gasoline having a low sulfur content (10 ppm by weight). The loss of olefins between the first heavy gasoline cut and the stabilized heavy gasoline obtained after the second hydrodesulfurization stage is 27.3% by mass (in absolute terms).

Example 3: (According to the Present Invention)

This example makes reference to the present invention, according to FIG. 1. The first heavy gasoline cut (line 7) obtained in example 1 is mixed with hydrogen and treated in a selective hydrodesulfurization unit (9), corresponding to stage a) of the present invention.

The first hydrodesulfurization stage (stage a)) is conducted in the presence of a CoMo catalyst supported on alumina. The temperature is 260° C., the pressure is 2 MPa, the liquid space velocity (expressed in volume of liquid per volume of catalyst and per hour) is 3 h⁻¹, the ratio of the hydrogen flow rate to the feedstock flow rate is 200 normal m³ per m³ under standard conditions. The effluent from the reactor (line 10) is then reheated in an oven (not shown in the figure) and then introduced into a second reactor (11) containing a "finishing" catalyst, corresponding to stage b). This selective hydrodesulfurization stage is carried out in the presence of an Ni catalyst supported on alumina. The temperature is 306° C., the pressure is 1.8 MPa, the liquid space velocity (expressed in volume of liquid per volume of catalyst and per hour) is 3 h⁻¹.

The characteristics of the heavy gasoline obtained after stage b) of the present invention are illustrated in table 5. The loss of olefins after stage b) is given in table 6.

TABLE 5

Characteristics of the heavy gasoline after hydrodesulfurization stage b) according to the invention

|  |  | Line 12 Hydrodesulfurized heavy gasoline after stage b) (according to the invention) |
|---|---|---|
| Organic sulfur content | (ppm S) | 19 |
| RSH sulfur content | (ppm S) | 10 |
| Olefin content | (% by weight) | 19.5 |

TABLE 6

Loss of olefins between the first heavy gasoline cut (line 7) and the heavy gasoline (line 12) obtained after stage b) according to the invention

|  |  | Loss of olefins (absolute) |
|---|---|---|
| Loss of olefins | (% by weight) | 22 |

The conditions of stage b) are less severe than in example 2: the loss of olefins at the end of stage b) is reduced by 5.3% by weight in this example according to the invention.

In stage c) according to the invention, a stage of removal of the $H_2S$ present in the effluent from stage b) is carried out.

The effluent from the reactor (11) is partially condensed in order to be introduced into the gas/liquid separator (13). The gas phase produced (line 14) contains essentially hydrogen and $H_2S$, possibly along with light hydrocarbons. The bottom of the separator contains a partially desulfurized heavy hydrocarbon cut. After condensation of the effluent from stage b) (line 15), the separation is carried out in a stabilization column (16) so as to produce a stabilized heavy gasoline cut (line 18) and a gas phase containing C4⁻ hydrocarbons and residual $H_2S$ (line 17).

The characteristics of the stabilized heavy cut obtained after stage c) of the present invention are illustrated in table 7.

TABLE 7

Characteristics of the stabilized heavy gasoline (line 18) after stage c) according to the invention

| | | Line 18 stabilized heavy gasoline |
|---|---|---|
| $H_2S$ content | (ppm by weight) | 0 |
| Organic sulfur content | (ppm by weight S) | 19 |
| RSH sulfur content | (ppm by weight S) | 10 |

In stage d) according to the invention, the stabilized heavy gasoline cut which is depleted in $H_2S$ is brought into contact with hydrogen in the hydrodesulfurization reactor (19) and in the presence of a "finishing" Ni catalyst supported on alumina. The temperature is 240° C., the pressure is 2 MPa, the liquid space velocity (expressed in volume of liquid per volume of catalyst and per hour) is 3 $h^{-1}$. The ratio of the hydrogen flow rate expressed in normal $m^3$ per hour to the flow rate of the feedstock to be treated expressed in $m^3$ per hour at standard conditions is less than that of stage a), specifically 80 $Nm^3/m^3$. Under these operating conditions, the hydrogenation of the olefins is negligible.

The characteristics of the effluent (22) obtained after stage d) of the present invention are illustrated in table 8.

TABLE 8

Characteristics of the heavy gasoline (line 22) after hydrodesulfurization stage d) according to the invention

| | | Line 22 Hydrodesulfurized heavy gasoline after stage d) according to the invention |
|---|---|---|
| Organic sulfur content | (ppm S) | 10 |
| RSH sulfur content | (ppm S) | 1 |

The desulfurized heavy cut (line 22) is sent, via a separation drum (23), to a stabilization column (26) in order to recover, at the top of the column, hydrogen and $H_2S$ (line 27), possibly along with light hydrocarbons, and, at the bottom of the column (line 28), a desulfurized hydrocarbon cut (stage e)). The characteristics of the heavy gasoline cut obtained after stabilization (28) of the present invention are illustrated in tables 9 and 10.

TABLE 9

Characteristics of the stabilized heavy gasoline (line 28) after stage e) according to the invention

| | | Line 28 Stabilized heavy gasoline according to the invention |
|---|---|---|
| Organic sulfur content | (ppm S) | 10 |
| RSH sulfur content | (ppm S) | 1 |
| Olefin content | (% by weight) | 19.7 |

TABLE 10

Loss of olefins between the first heavy gasoline cut (line 7) and the stabilized heavy gasoline (line 28) after stage e)

| | | Loss of olefins Heavy gasoline according to the invention (absolute) |
|---|---|---|
| Loss of olefins | (% by weight) | 21.2 |

Very advantageously, the process according to the invention makes it possible to produce a gasoline having a low sulfur content (10 ppm S) while at the same time reducing the absolute loss of olefins compared to the desulfurized heavy gasoline after the second desulfurization stage (presented in comparative example 2).

Specifically, in example 2 the loss of olefins (in % by mass) between the first heavy gasoline cut (7) and the gasoline obtained after the second hydrodesulfurization stage (12) is 6.8% and in example 3 according to the invention the loss of olefins between the first heavy gasoline cut (7) and the desulfurized and stabilized heavy gasoline (28) is 5.5%. Thus, example 3 according to the invention makes it possible to retain a relative 19% of the olefins present in the first heavy gasoline cut (7) while producing a gasoline with the same low sulfur content (10 ppm). The retention of the olefins has a positive impact on the octane numbers of the gasoline produced.

The process according to the invention thus makes it possible to obtain, after stabilization, a heavy gasoline cut having a low content of organic sulfur (10 ppm) and with very few mercaptans. This gasoline may, with the light gasoline obtained in example 1, be profitably exploited in the gasoline pool for formulating vehicle fuel.

The invention claimed is:

1. A process for the treatment of a gasoline containing sulfur compounds, olefins and diolefins, the process comprising at least the following stages:
   a) the gasoline, hydrogen, and a hydrodesulfurization catalyst comprising an oxide support and an active phase comprising a metal from group VIB and a metal from group VIII are brought into contact in at least one reactor at a temperature of between 210 and 320° C., at a pressure of between 1 and 4 MPa, with a space velocity of between 1 and 10 $h^{-1}$ and a ratio of the hydrogen flow rate, expressed in normal $m^3$ per hour, to the flow rate of feedstock to be treated, expressed in $m^3$ per hour at standard conditions, of between 100 and 600 $Nm^3/m^3$, so as to convert at least a portion of the sulfur compounds into $H_2S$,
   b) the effluent resulting from stage a) without removal of the $H_2S$ formed, hydrogen, and a hydrodesulfurization catalyst comprising an oxide support and an active phase consisting of at least one metal from group VIII are brought into contact in at least one reactor at a temperature of between 280 and 400° C., at a pressure of between 0.5 and 5 MPa, with a space velocity of between 1 and 10 $h^{-1}$ and a ratio of the hydrogen flow rate, expressed in normal $m^3$ per hour, to the flow rate of feedstock to be treated, expressed in $m^3$ per hour at standard conditions, of between 100 and 600 $Nm^3/m^3$, said temperature of stage b) being higher than the temperature of stage a),
   c) a stage of separation of the $H_2S$ formed and present in the effluent resulting from stage b) is carried out, d) the effluent depleted in $H_2S$ resulting from stage c), hydrogen, and a hydrodesulfurization catalyst comprising an oxide support and an active phase comprising a metal from group VIB and a metal from group VIII or an active phase consisting of at least one metal from group VIII are brought into contact in at least one reactor at a temperature of between 150 and 330° ° C., at a pressure of between 0.5 and 5 MPa, with a space velocity of between 0.5 and 10 $h^{-1}$ and a ratio of the hydrogen flow rate to the flow rate of feedstock to be treated which is lower than that of stage a), the ratio of the hydrogen flow rate, expressed in normal $m^3$ per hour ($Nm^3/h$), to the flow rate of feedstock to be treated, expressed in $m^3$ per hour at standard conditions, being between 40 and 250 $Nm^3/m^3$, and e) a stage of separation of the $H_2S$ formed and present in the effluent resulting from stage d) is carried out.

2. The process as claimed in claim 1, in which the catalyst of stage a) comprises alumina and an active phase comprising cobalt, molybdenum and optionally phosphorus, said catalyst containing a content by weight, with respect to the total weight of catalyst, of cobalt oxide, in CoO form, of between 0.1% and 10%, a content by weight, with respect to the total weight of catalyst, of molybdenum oxide, in $MoO_3$ form, of between 1% and 20%, a cobalt/molybdenum molar ratio of between 0.1 and 0.8 and a content by weight, with respect to the total weight of catalyst, of phosphorus oxide in $P_2O_5$ form of between 0.3% and 10% when phosphorus is present, said catalyst having a specific surface area of between 30 and 180 $m^2/g$.

3. The process as claimed in claim 1, in which the catalyst of stage b) consists of alumina and of nickel, said catalyst containing a content by weight, with respect to the total weight of catalyst, of nickel oxide, in NiO form, of between 5% and 20%, said catalyst having a specific surface area of between 30 and 180 $m^2/g$.

4. The process as claimed in claim 1, in which the catalyst of stage d) consists of alumina and of a cobalt-molybdenum active phase, said catalyst containing a content by weight, with respect to the total weight of catalyst, of cobalt oxide, in CoO form, of between 0.1% and 10%, a content by weight, with respect to the total weight of catalyst, of molybdenum oxide, in $MoO_3$ form, of between 1% and 20%, and a cobalt/molybdenum molar ratio of between 0.1 and 0.8, said catalyst having a specific surface area of between 30 and 180 $m^2/g$.

5. The process as claimed in claim 1, in which the catalyst of stage d) consists of alumina and of nickel, said catalyst containing a content by weight, with respect to the total weight of catalyst, of nickel oxide, in NiO form, of between 5% and 20%, said catalyst having a specific surface area of between 30 and 180 $m^2/g$.

6. The process as claimed in claim 1, in which the temperature of stage b) is greater by at least 5° C. than the temperature of stage a).

7. The process as claimed in claim 1, in which the temperature of stage d) is lower by at least 5° C. than the temperature of stage b).

8. The process as claimed in claim 1, in which the ratio of ratio of the hydrogen flow rate to the flow rate of feedstock to be treated at the inlet of the reactor of stage a)/ratio of the hydrogen flow rate to the flow rate of feedstock to be treated at the inlet of the reactor of stage d) is greater than or equal to 1.05.

9. The process as claimed in claim 1, in which the separation stages c) and e) are carried out in a debutanizer or a stripping section.

10. The process as claimed in claim 1, in which, before stage a), a stage of distillation of the gasoline is carried out so as to fractionate said gasoline into at least two, light and heavy, gasoline cuts, and the heavy gasoline cut is treated in stages a), b), c), d) and e).

11. The process as claimed in claim 1, in which, before stage a) and before any optional distillation stage, the gasoline is brought into contact with hydrogen and a selective hydrogenation catalyst in order to selectively hydrogenate the diolefins contained in said gasoline to give olefins.

12. The process as claimed in claim 1, in which the gasoline is a catalytic cracking gasoline.

13. The process as claimed in claim 1, in which, in stage a), the gasoline, hydrogen and hydrodesulfurization catalyst are brought into contact in the at least one reactor at a temperature of between 220 and 290° C., at a pressure of between 1.5 and 3 MPa, with a space velocity of between 2 and 8 $h^{-1}$ and a ratio of the hydrogen flow rate, expressed in normal $m^3$ per hour, to the flow rate of feedstock to be treated, expressed in $m^3$ per hour at standard conditions, of between 200 and 500 $Nm^3/m^3$.

14. The process as claimed in claim 1, in which, in stage b), the effluent resulting from stage a) without removal of the $H_2S$ formed, hydrogen and the hydrodesulfurization catalyst are brought into contact in the at least one reactor at a temperature of between 290 and 380° C., at a pressure of between 1 and 3 MPa, with a space velocity of between 2 and 8 $h^{-1}$ and a ratio of the hydrogen flow rate, expressed in normal $m^3$ per hour, to the flow rate of feedstock to be treated, expressed in $m^3$ per hour at standard conditions, of between 200 and 500 $Nm^3/m^3$, said temperature of stage b) being higher than the temperature of stage a).

15. The process as claimed in claim 1, in which the temperature of stage b) is greater by at least 10° C. than the temperature of stage a).

16. The process as claimed in claim 1, in which the temperature of stage b) is greater by at least 30° C. than the temperature of stage a).

17. The process as claimed in claim 1, in which the separation stage c) is carried out in a debutanizer.

18. The process as claimed in claim 1, in which the separation stage e) is carried out in a debutanizer.

19. The process as claimed in claim 1, in which, in stage d), the effluent depleted in $H_2S$ resulting from stage c), hydrogen and the hydrodesulfurization catalyst are brought into contact in the at least one reactor at a temperature of between 180 and 300°, at a pressure of between 1 and 3 MPa, with a space velocity of between 2 and 8 $h^{-1}$ and a ratio of the hydrogen flow rate to the flow rate of feedstock to be treated which is lower than that of stage a), the ratio of the hydrogen flow rate, expressed in normal $m^3$ per hour ($Nm^3/h$), to the flow rate of feedstock to be treated, expressed in $m^3$ per hour at standard conditions, being between 50 and 250 $Nm^3/m^3$.

20. The process as claimed in claim 1, in which the ratio of ratio of the hydrogen flow rate to the flow rate of feedstock to be treated at the inlet of the reactor of stage a)/ratio of the hydrogen flow rate to the flow rate of feedstock to be treated at the inlet of the reactor of stage d) is between 1.1 and 6.

* * * * *